Patented Nov. 8, 1949

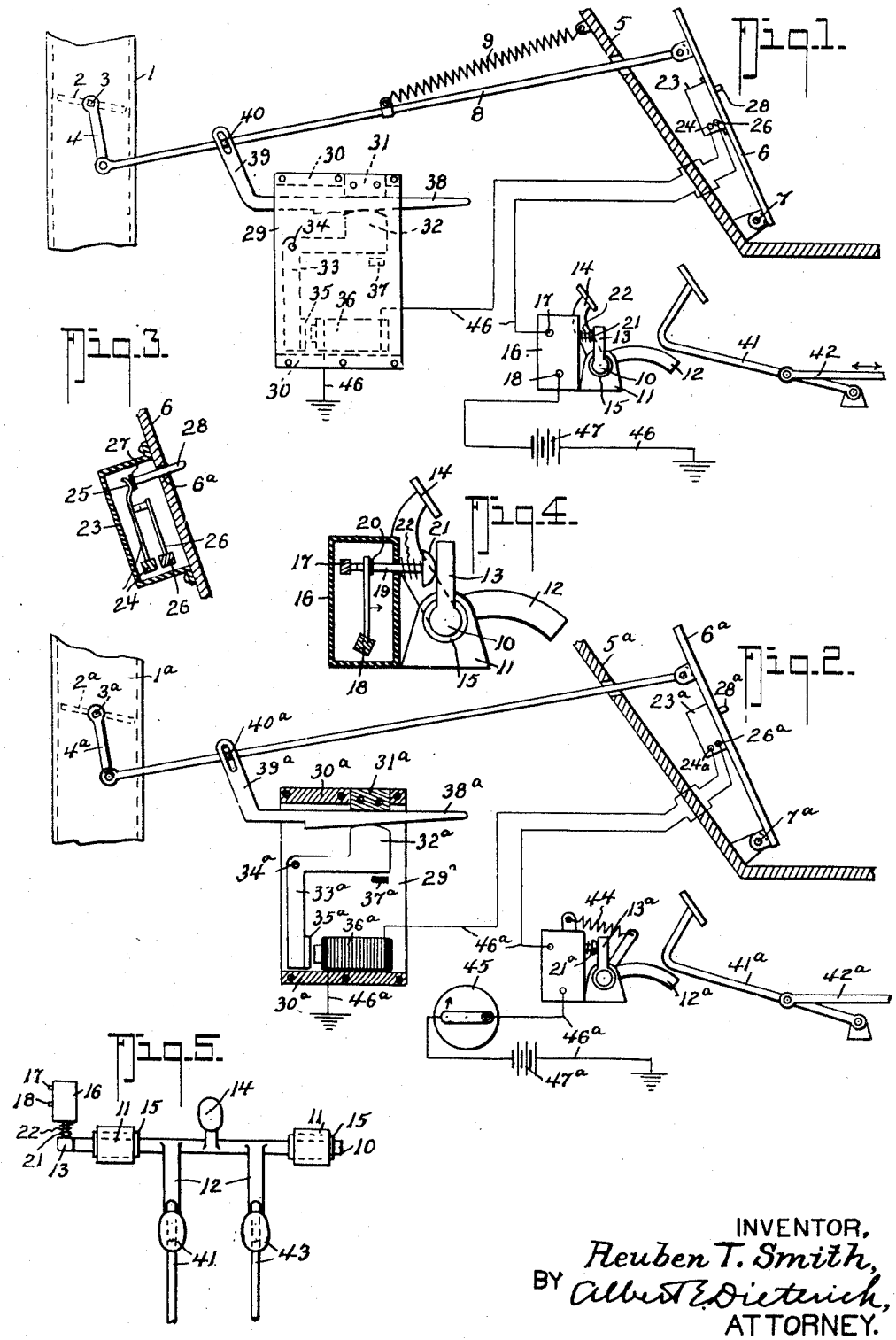

2,487,606

UNITED STATES PATENT OFFICE 2,487,606

POWER CONTROL

Reuben T. Smith, Calhoun City, Miss.

Application May 31, 1946, Serial No. 673,577

6 Claims. (Cl. 192—.058)

1

In operating or driving motor vehicles which are propelled by a prime mover, and in the control of the power or speed of the prime mover, the operator frequently is obliged to maintain, for considerable periods of time, a certain setting of the throttle or control means against force, as for instance, a spring or counterweight tending to restore the control means to the "closed throttle" or "off" position. This results in the operator becoming fatigued.

My invention has for its objects:

1. To provide a new and improved electrically operated, manually controlled means for automatically "locking" the throttle or control means in any desired "open" or "on" position;

2. To provide a normally closed switch, mounted on the accelerator pedal, for opening the "locking" means circuit while the operator is using the pedal in the normal way to relieve the operator of the necessity of thinking to disconnect the locking means in order to be able to control the throttle in the conventional manner;

3. To provide a second switch in the same circuit, which may be set to closed-circuit position by the operator when he desires to place the throttle "locking" means in operative relation to the pedal-carried switch;

4. To provide means whereby the second switch may be moved to open-circuit position by either or both, the brake pedal and the clutch pedal, when the operator's foot is no longer on the accelerator pedal;

5. To provide a new and improved electrically energized throttle holding or "locking" device that is connected to the connecting rod or means between the accelerator pedal and the throttle operating arm.

Other objects will in part be obvious and in part be pointed out hereinafter.

To the attainment of the aforesaid objects and ends the invention further resides in the novel details of construction, combination and arrangement of parts all of which will be first fully described hereinafter and then be specifically pointed out in the appended claims, reference being had to the accompanying drawing, in which:

Fig. 1 is a diagrammatic view illustrating my invention.

Fig. 2 is a view similar to Fig. 1 but showing a slight modification.

Fig. 3 is an enlarged detail sectional view of the pedal-carried switch shown in Figs. 1 and 2.

Fig. 4 is an enlarged detail vertical section of the second switch shown in Figs. 1 and 2.

2

Fig. 5 is a detail plan view of the rock shaft, the second switch and the clutch and brake pedals with which the rock shaft cooperates.

In the drawing in which like numerals and letters of reference indicate like parts in all the figures, 1 represents a fuel passage or duct which contains the throttle or control valve 2 mounted on a shaft 3 having an arm 4 to which is attached one end of a connecting rod 8, the other end of which is attached to the accelerator pedal 6. The pedal 6 is pivoted at 7 to the foot board 5 of the vehicle.

The throttle valve 2 is continuously urged toward its closed or off position by a suitable spring 9.

A rock shaft 10 is mounted in suitably located supports 11 in, preferably, friction bearings 15 to hold the shaft in any position to which it may be turned. The shaft 10 has cams or fingers 12, one for cooperation with the brake pedal and the other for cooperation with the clutch pedal. It also has a lug 13 that is adapted to engage a push button 21 on the plunger 19 of a second switch 16 that is mounted adjacent the rock shaft.

A pedal 14 is also carried by the shaft 10 through the medium of which the operator may turn the shaft to cause the second switch to close the circuit through it.

The second switch 16 includes a pair of contacts 17 and 18, one of which 18, at least, is spring loaded to continuously tend to open the circuit and is engaged by an insulation button 20 on the plunger 19.

If desired, a light spring 22 may be used to move the plunger outwardly to permit the contacts 17 and 18 to separate and open the circuit when lug 13 is not forcing the plunger 19 inwardly.

The pedal-carried switch 23 includes a pair of contact elements 24, 26, at least one of which, 24, is resilient and continuously tends to close the circuit between the elements 24, 26.

A plunger 28 operates through a hole 45 in the pedal 6 and has an insulating button 27 to engage a projection 25 of contact element 24 for the purpose of opening the circuit through the pedal switch when the operator's foot depresses the plunger 28 when the operator desires to change the degree of throttle opening from that in which it is locked, or desires to shift gears or to control the throttle in the conventional manner.

The throttle "locking" device comprises a base or housing consisting of side plates 29 and spacers 30. Between the side plates 29 is secured a fixed stop or abutment 31 constituting one element of a clamping device, the other element of which comprises a member 32 on one end of a bell crank lever 33. The lever 33 is fulcrumed at 34 and its other end carries an armature 35 to cooperate with the electro-magnet 36. A stop 37 is provided to limit the movement of the bell crank lever in one direction.

A tapered or wedge-like bar 38 operates between the clamp members 31, 32 and has a portion 39 pivotally connected at 40 to the rod 8. When the magnet 36 is energized it will cause members 32, 31 to grip and hold bar 38 in whatever position it may be in at the time. By tapering bar 38 as shown, the action of spring 9 tends to wedge the bar in place between clamp members 31, 32 and yet permits easy withdrawal of the bar when pedal 6 is pushed in even though the circuit through magnet 36 be still closed. Furthermore, the taper of the bar 38 permits the armature 35 to move closer to the magnet 36 and thus decrease the effective air gap between the parts 35 and 36 to cause increased locking or clamping effect through the bell crank lever 33, member 32 and abutment 31 upon the tapered bar 38 to give increased locking power against the increased urge of spring 9 in the more open position of the throttle valve 2.

The clutch pedal is indicated by 41. The connection between it and the clutch (not shown) is indicated by 42, while the brake pedal is indicated by 43.

In Fig. 2 those parts which are the same as corresponding parts in Fig. 1 bear the same reference number plus the index letter *a*.

44 indicates a spring, 45 indicates a manual switch, 46ª indicates the electric circuit containing the switches 16ª, 24ª, magnet 36ª and battery 47ª.

*Operation*

As applied to motor vehicles the apparatus functions as follows:

After the power or speed has been brought to the value desired, pedal 14 is depressed to turn shaft 10 so as to cause lug 13 to push in the plunger 19 and close the circuit between contacts 17 and 18. Current will then flow from battery 47 to contact 18, to contact 17, to switch 16 and thence to contact 26, to contact 24, to magnet 36, and return via ground to battery.

When the operator desires to increase or decrease the power or speed he again puts his foot on the pedal over the plunger 28 and thereby first opens or closes the circuit at switch 23 and then opens throttle valve 2 as required.

To hold the throttle valve at the desired position the operator slips or tilts his foot off the plunger 28 while holding pedal 6 in position. This immediately closes the circuit at switch 23 again, energizing magnet 36 and "locking" the bar 38. He may then remove his foot from pedal 6 and rest. Upon applying the brake or releasing the clutch one or the other finger 12 of shaft 10 will be engaged and shaft 10 turned to move lug 13 away from switch 16, thus permitting plunger 19 to move out and the circuit to be opened between contacts 17 and 18, thus de-energizing magnet 36 and releasing clamp 32.

To meet a few conditions where it might be desirable that the clamping action be resumed after releasing pedals 41, 43, without the necessity of depressing pedal 14, a spring 44 may be provided to restore shaft 10, lug 13 and finger 12 to the position for closing contacts 17 and 18. In the event of adding spring 44 (Fig. 2), a switch 45 would be placed in circuit so that when non-use of the clamping device is desired the circuit can be opened by the operator opening switch 45.

Applicant is the same applicant who filed applications Serial No. 673,578, now Patent #2,479,646, issued August 23, 1949, and No. 673,579 on even date with this application.

The drawing and above description illustrate preferred embodiments of the invention which, however, may be modified within the scope of the appended claims without departing from the invention.

What I claim is:

1. In a throttle control system for a vehicle wherein is provided a fuel throttle valve, an accelerator pedal, an operating connection between said pedal and said valve, and brake and clutch operating elements, and means for locking said valve in any desired open position: the improvement which comprises an electromagnetic locking device which includes a wedge-shaped latch bar connected to and movable with said operating connection; a stationary clamp member and a movable clamp member between which said wedge-shaped latch bar operates; an electromagnet for effecting clamping action between said stationary and movable clamp members; an electric circuit including said magnet; a normally closed switch mounted on the accelerator pedal and including a member projecting in front of the said accelerator pedal for engagement by the operator's foot when forcing the accelerator pedal down, said switch having contact elements in said electric circuit; a second switch in series with the switch on the accelerator pedal and including a pair of contacts with means continuously tending to open the circuit between the same; a rock shaft having a switch closing lug to cooperate with said second switch and having a finger engageable by one of said operating elements to effect an opening of the circuit at said second switch when the operating element is depressed; and means under the control of an operator for moving said rock shaft to cause said lug to effect a closing of the circuit at said second switch for purposes described.

2. In a throttle control system for a vehicle wherein is provided a fuel throttle valve, an accelerator pedal, an operating connection between said pedal and said valve, and brake and clutch pedals, and means for locking said valve in any desired open position: the improvement which comprises an electromagnetic locking device which includes a wedge-shaped latch bar connected to and movable with said operating connection; a stationary clamp member and a movable clamp member between which said wedge-shaped latch bar operates; an electro-magnet for effecting clamping action between said stationary and movable clamp members; an electric circuit including said magnet; a normally closed switch mounted on the accelerator pedal and including a member projecting in front of the said accelerator pedal for engagement by the operator's foot when forcing the accelerator pedal down, said switch having contact elements in said electric circuit; a second switch in series with the switch on the accelerator pedal and including a pair of contacts with means continuously tending to open the circuit between the same; a rock shaft having a switch closing lug to cooperate with said second switch and having a finger engageable by the brake pedal to effect an opening of the circuit at said second switch when the brake pedal is depressed; and means under the control of an operator for moving said rock shaft to cause said lug to effect a closing of the circuit at said second switch for purposes described.

3. In apparatus of the class described wherein is provided a throttle valve, an accelerator member, a power transmitting connection between said accelerator member and said throttle valve, and wherein is provided clutch and brake pedals: the improvement which includes an electro-magnetically operated device for holding said throttle valve in a predetermined position; a foot controlled circuit-opening switch mounted on the accelerator member in a position to be operated by an operator's foot on said accelerator member; a second switch having means continuously tending to open the circuit and connected in series with the first mentioned switch; a rock shaft cooperatively mounted adjacent said second switch and having a member to operate said second switch to close the circuit through the same; an electric circuit in which said switches and said throttle holding device are connected in series; said rock shaft having fingers projected into the paths of the clutch and brake pedals by virtue of which when either or both the clutch and brake pedals are depressed said rock shaft will be rocked to operatively release its lug from said second switch to cause the opening of the circuit at said second switch for purposes described.

4. In apparatus of the class described wherein is provided a throttle valve, means to operate said throttle valve to open and close the same and including a movable actuating lever, and wherein is provided a vehicle-brake lever; the improvement which includes a throttle valve "lock" device which includes a stationary element, a lever one arm of which cooperates with said stationary element and a wedge-shaped latch bar operatively connected with said throttle valve operating means and with said stationary element and said last named lever, and means to effect a locking action and a lock release action of said "lock" device, said last named means including two control devices, one mounted on said movable actuating lever and the other control device being operatively connected with the first control device and operative by said vehicle-brake lever to render the first device operative or unoperative at will, said control device that is mounted on said movable actuating lever being so positioned on the same lever as to be operative at will by the operator of the lever without stopping the operation of the lever for throttling purposes.

5. In a throttle control system for a vehicle wherein is provided a fuel throttle valve, an accelerator pedal, an operating connection between said pedal and said valve, and brake and clutch operating elements, and means for locking said valve in any desired open position: the improvement which includes an electromagnetic locking device which includes a wedge-shaped latch bar connected to and movable with said operating connection; a stationary clamp member and a movable clamp member between which said wedge-shaped latch bar operates; an electromagnet for effecting clamping action between said stationary and movable clamp members; an electric circuit including said magnet; a normally closed switch mounted on the accelerator pedal and including a member projecting in front of the said accelerator pedal for engagement by the operator's foot when forcing the accelerator pedal down, said switch having contact elements in said electric circuit.

6. In a throttle control system for a vehicle wherein is provided a fuel throttle valve, an accelerator pedal, and an operating connection between said pedal and said valve, and means for locking said valve in any desired open position: the improvement which includes a wedge-shaped latch bar operatively connected to said operating connection; a stationary clamp member and a lever between one arm of which and said stationary clamp member said wedge-shaped latch bar operates; an electro-magnet operatively connected to the other arm of said lever for effecting clamping action between said lever and said stationary clamp member; an electric circuit including said magnet; a normally closed switch on the pedal, which switch has contact elements in said electric circuit, and means other than said switch mounted on said vehicle and operatively connected to said electric circuit for rendering said magnet circuit operative or inoperative at the will of the operator when said first switch is closed.

REUBEN T. SMITH.

REFERENCES CITED

The following references are of record in the file of this patent:

UNITED STATES PATENTS

| Number | Name | Date |
|---|---|---|
| 1,375,436 | Young | Apr. 19, 1921 |
| 1,976,471 | Adams | Oct. 9, 1934 |
| 2,021,832 | Callihan | Nov. 19, 1935 |
| 2,082,583 | Lindbloom | June 1, 1937 |
| 2,159,772 | Schroedter | May 23, 1939 |
| 2,206,586 | Struck | July 2, 1940 |
| 2,208,473 | Ross | July 16, 1940 |
| 2,270,002 | Glick | Jan. 13, 1942 |
| 2,423,006 | Chambers | June 24, 1947 |

FOREIGN PATENTS

| Number | Country | Date |
|---|---|---|
| 505,330 | Great Britain | May 9, 1939 |